US012770652B2

(12) United States Patent
Nishida et al.

(10) Patent No.: US 12,770,652 B2
(45) Date of Patent: Oct. 20, 2026

(54) DISK DRIVE SUSPENSION

(71) Applicant: NHK SPRING CO., LTD., Yokohama (JP)

(72) Inventors: Tatsuhiko Nishida, Yokohama (JP); Mikio Arai, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 19/365,201

(22) Filed: Oct. 22, 2025

(65) Prior Publication Data

US 2026/0134882 A1 May 14, 2026

(30) Foreign Application Priority Data

Nov. 8, 2024 (JP) ................................ 2024-195603

(51) Int. Cl.
*G11B 5/48* (2006.01)

(52) U.S. Cl.
CPC .................................. *G11B 5/4833* (2013.01)

(58) Field of Classification Search
None
See application file for complete search history.

(56) References Cited

U.S. PATENT DOCUMENTS 6,256,172 B1 * 7/2001 Griesbach .............. G11B 5/486 360/246
8,553,364 B1 * 10/2013 Schreiber ............... G11B 5/486 360/245.9
2004/0165305 A1 * 8/2004 Nishiyama ........... G11B 5/5552
2005/0280944 A1 * 12/2005 Yang ...................... G11B 5/486 360/245.9
2012/0140360 A1 * 6/2012 Contreras .............. G11B 5/486
2013/0314821 A1 11/2013 Arai et al.
2014/0022674 A1 1/2014 Takikawa et al.
2015/0015990 A1 * 1/2015 Chou ................... G11B 5/4813 360/75
2018/0040343 A1 * 2/2018 Ee .......................... G11B 5/483
2022/0101876 A1 * 3/2022 Ogaki .................... G11B 5/483
2023/0186947 A1 * 6/2023 Byoun ................... G11B 5/556 360/78.05
2025/0336416 A1 * 10/2025 Kishimoto ............. G11B 5/486
2026/0118212 A1 * 4/2026 Nishida ................. G01M 7/025

FOREIGN PATENT DOCUMENTS

JP 2013246840 A 12/2013
JP 2014022015 A 2/2014

* cited by examiner

*Primary Examiner* — William J Klimowicz
(74) *Attorney, Agent, or Firm* — Holtz, Holtz & Volek PC

(57) ABSTRACT

A suspension of an embodiment includes a first actuator including a piezoelectric element, a second actuator including a piezoelectric element, and a third actuator including a piezoelectric element. A first conductor supplies a first alternating current to the first actuator. A second conductor supplies a second alternating current to the second actuator. A third conductor supplies a third alternating current with a phase opposite to the second alternating current to the third actuator. The first conductor includes a first and a second proximity portions. The first proximity portion extends along the second conductor in the longitudinal direction of the wiring unit. The second proximity portion extends along the third conductor in the longitudinal direction of the wiring unit.

5 Claims, 7 Drawing Sheets

DISK DRIVE SUSPENSION

CROSS-REFERENCE TO RELATED APPLICATIONS

This application is based upon and claims the benefit of priority from prior Japanese Patent Application No. 2024-195603, filed Nov. 8, 2024, the entire contents of which are incorporated herein by reference.

BACKGROUND OF THE INVENTION

1. Field of the Invention

The present invention relates to a disk drive suspension comprising a plurality of actuators such as piezoelectric elements.

2. Description of the Related Art

A hard disk drive (HDD) is used in an information processing apparatus. The hard disk drive is hereinafter referred to as a disk drive. The disk drive includes a magnetic disk which rotates about a spindle, a carriage which turns about a pivot, and the like. A disk drive suspension is provided on an arm of the carriage. The disk drive suspension is hereinafter simply referred to as a suspension.

The suspension comprises a base plate, a load beam, a flexure provided along the load beam, and the like. A slider is provided on a gimbal portion formed near a distal end of the flexure. An element for performing access such as reading or writing of data recorded in a disk is provided on a slider.

To increase the recording density of the disk, the magnetic head needs to be positioned more quickly and more accurately relative to the recording surface of the disk. For this reason, a suspension equipped with an actuator for coarse movement and an actuator for fine movement has been developed. A piezoelectric element which operates in response to a voltage is known as an actuator for fine movement.

A suspension disclosed in JP2013-246840A (Patent Literature 1) has an actuator mounted near a base plate of the suspension. A suspension disclosed in JP2014-22015A (Patent Literature 2) has an actuator for fine movement mounted on a gimbal portion. A suspension comprising an actuator for coarse movement and an actuator for fine movement is also known.

A multi-stage actuator-type suspension comprising an actuator provided at a first position of the suspension and an actuator provided at a second position, is also known. For example, a suspension including a first actuator provided at a first position, in a longitudinal direction of the suspension, and a second actuator and a third actuator provided at a second position of the suspension is also known. The first position is, for example, near a base plate of the suspension. The second position is, for example, near a distal end of the suspension.

An alternating current for driving is applied to the first actuator through a first conductor of the wiring unit. Alternating currents having phases opposite to each other are applied to the second actuator and the third actuator through a second conductor and a third conductor of the wiring unit, respectively. These second and third actuators are paired. For this reason, the second and third conductors are also paired. Therefore, in a conventional wiring unit, the second and third conductors are provided to be adjacent to each other, on one side of the first conductor, in an ordinary case.

To ensure the functions of the suspension correctly, it is necessary to accurately understand its vibration characteristics. For this reason, the present inventors conducted tests of measuring the vibration characteristics of the suspension. In the tests of measuring the vibration characteristics, the suspension itself can be made to vibrate by, for example, supplying vibration signals to the second actuator and the third actuator, respectively.

Depending on the specifications of the disk drive, a first suspension facing a first face of a single disk and a second suspension facing a second face of the disk may be provided. The first suspension is provided such that an air bearing surface of a slider faces the first face (for example, a surface) of the disk. The second suspension is provided such that the air bearing surface of the slider faces the second face (for example, a back surface) of the disk. The first suspension and the second suspension have shapes mirroring with the disk sandwiched therebetween.

Therefore, in vibration tests, if the vibration signals supplied to the first suspension and the second suspension are the same, the vibration waveforms of the first suspension and the second suspension should be the same. In intensive research, however, the present inventors found cases where the vibration waveforms of the first suspension and the second suspension are inconsistent.

The present inventors conducted intensive research on the reason why the vibration waveforms of the first suspension and the second suspension are different from each other. For example, when vibration signals were supplied to the second conductor and the third conductor of the wiring unit, crosstalk was detected in the first conductor on the non-excitation side. The present inventors obtained knowledge that this phenomenon was caused by the fact that the vibration waveforms of the first and second suspensions were different. Since crosstalk may affect operations of actuators, suppression of the crosstalk was desired.

The object of the present invention is to provide a disk drive suspension comprising a plurality of actuators, which is capable of suppressing crosstalk occurring in a wiring unit.

BRIEF SUMMARY OF THE INVENTION

One embodiment is a disk drive suspension including a first actuator provided at a first position, a second actuator and a third actuator provided at a second position, and a wiring unit. The wiring unit includes a first conductor, a second conductor, and a third conductor. The first conductor is electrically connected to the first actuator and supplies a first alternating current to the first actuator. The second conductor is electrically connected to the second actuator and supplies a second alternating current to the second actuator. The third conductor is electrically connected to the third actuator and supplies a third alternating current having a phase opposite to the second alternating current to the third actuator. The first conductor includes a first proximity portion and a second proximity portion. The first proximity portion is provided at a position closer to the second conductor than to the third conductor and extends along the second conductor in a longitudinal direction of the wiring unit. The second proximity portion is provided at a position closer to the third conductor than to the second conductor and extends along the third conductor in the longitudinal direction of the wiring unit.

Similarly to the embodiment shown in FIG. 5, the first conductor may be provided between the second conductor and the third conductor. The first conductor includes a first proximity portion extending along the second conductor in the longitudinal direction of the wiring unit and a second proximity portion extending along the third conductor in the longitudinal direction of the wiring unit.

Similarly to the embodiment shown in FIG. 8, the second conductor and the third conductor may be provided to be adjacent to each other. The first conductor has a first energized section and a second energized section. The first energized section is set outside the second conductor and extends along the second conductor in the longitudinal direction of the wiring unit. This first energized section includes the first proximity portion. The second energized section is set outside the third conductor and extends along the third conductor in the longitudinal direction of the wiring unit. This second energized section includes the second proximity portion. The first energized section and the second energized section may be connected to each other by a jumper conductor.

Similarly to the embodiment shown in FIG. 9, the first conductor may be provided between the second conductor and the third conductor. The first conductor has the first energized section and the second energized section. The first energized section extends along the second conductor in the longitudinal direction of the wiring unit and includes the first proximity portion. The second energized section extends along the third conductor in the longitudinal direction of the wiring unit and includes the second proximity portion.

Similarly to the embodiment shown in FIG. 10, the first conductor may have the first energized section and the second energized section. In this case, the first energized section is set outside the second conductor and extends along the second conductor in the longitudinal direction of the wiring unit. The first energized section includes the first proximity portion. Furthermore, the second energized section is set between the second conductor and the third conductor and extends along the third conductor in the longitudinal direction of the wiring unit. The second energized section includes the second proximity portion. The first energized section and the second energized section may be connected to each other by a jumper conductor.

According to one embodiment, crosstalk occurring in the wiring unit can be suppressed in a disk drive suspension which comprise a plurality of actuators and a wiring unit supplying drive signals to these actuators.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A first suspension 10A and a second suspension 10B according to the first embodiment will be hereinafter described with reference to FIG. 1 through FIG. 7.

Figure 1:
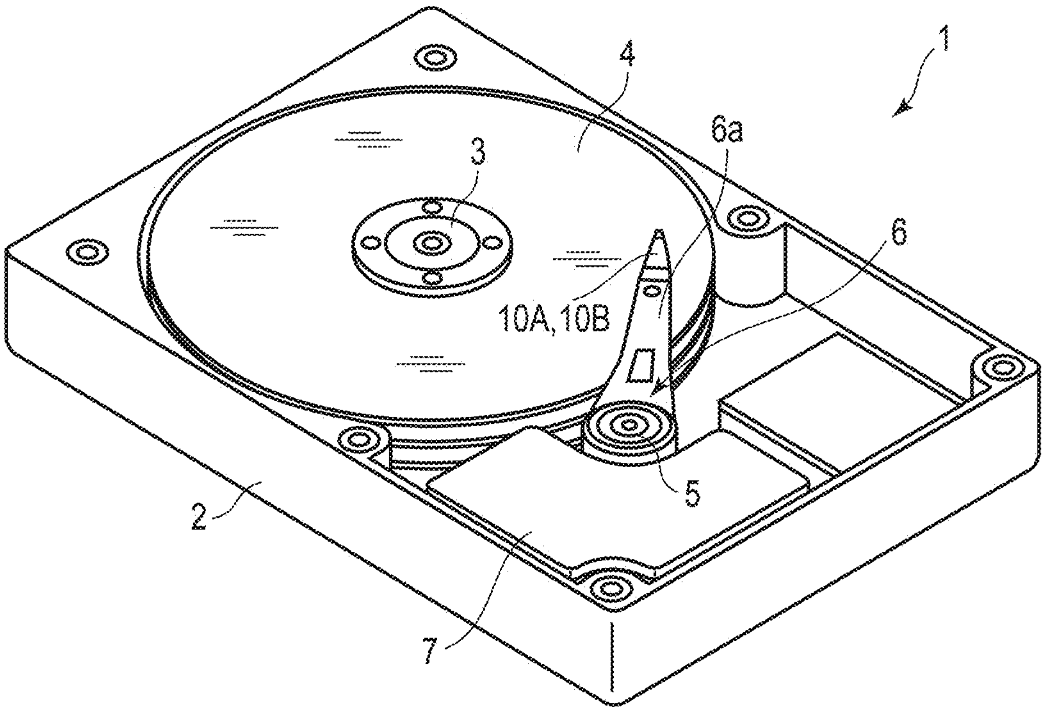
FIG. 1 is a perspective view showing an example of a disk drive.
Figure 2:
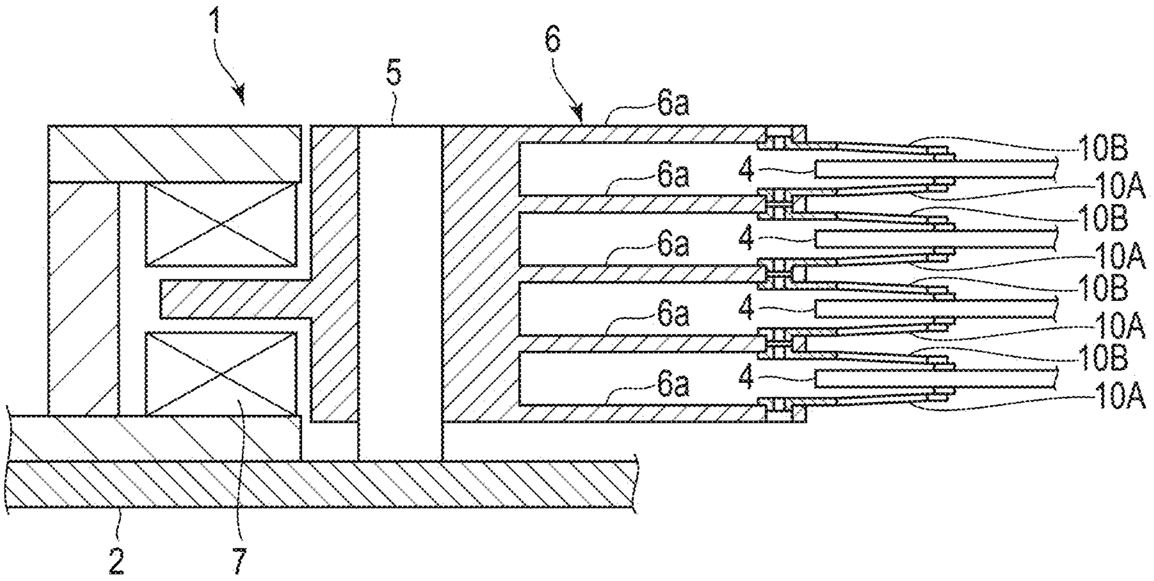
FIG. 2 is a cross-sectional view schematically showing the disk drive.

FIG. 1 is a perspective view showing an example of a hard disk drive (HDD) 1. The hard disk drive is hereinafter simply referred to as a disk drive. FIG. 2 is a cross-sectional view schematically showing the disk drive 1. The disk drive 1 includes a casing 2, a disk 4 which rotates about a spindle 3, a carriage 6, a positioning motor 7, and the like. The carriage 6 revolves about a pivot 5. The motor 7 makes the carriage 6 revolve. The casing 2 is sealed by a lid (not shown).

As shown in FIG. 2, the first suspension 10A is attached to a first surface of each arm **6*a* of the carriage 6. The second suspension 10B is mounted on a second surface (i.e., a surface on a side opposite to the first surface) of each arm 6*a*. The first suspension 10A and the second suspension 10B face each other with the disk 4** interposed therebetween.

Figure 3:
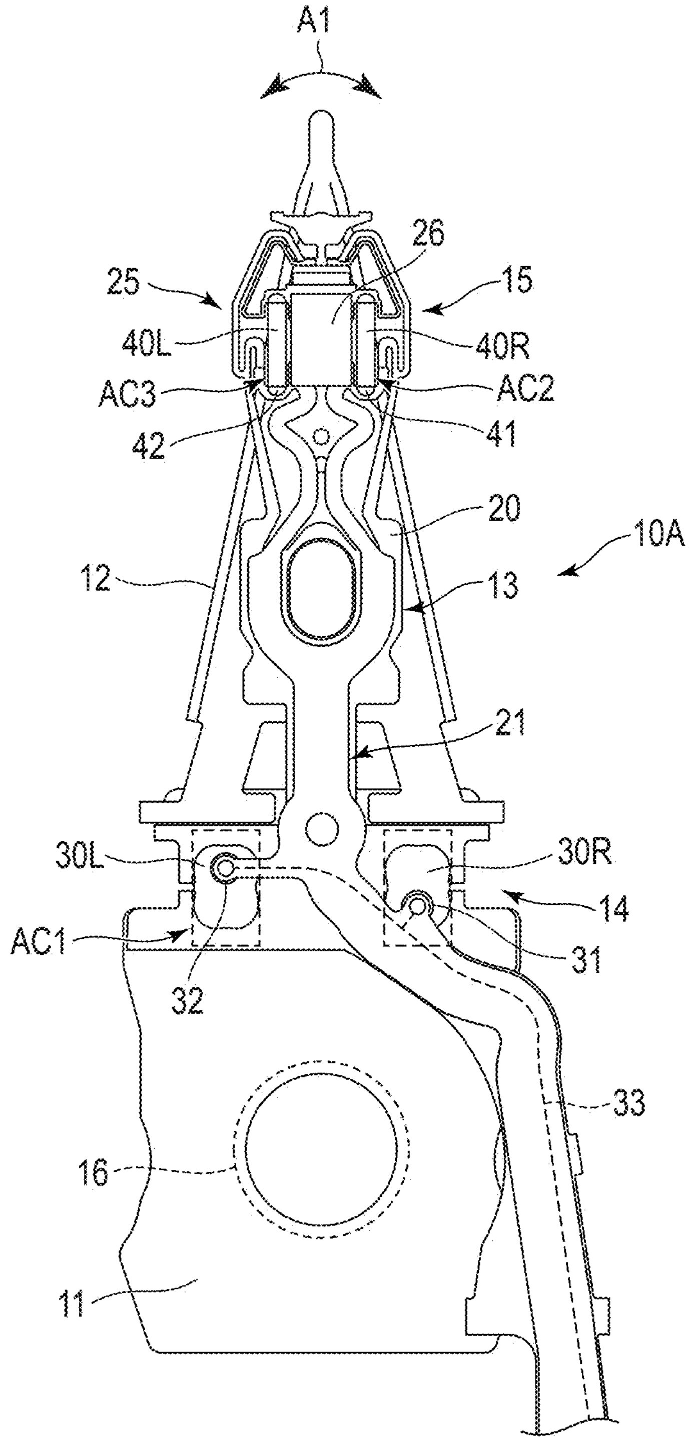
FIG. 3 is a plan view showing an example of a first suspension according to a first embodiment.
Figure 4:
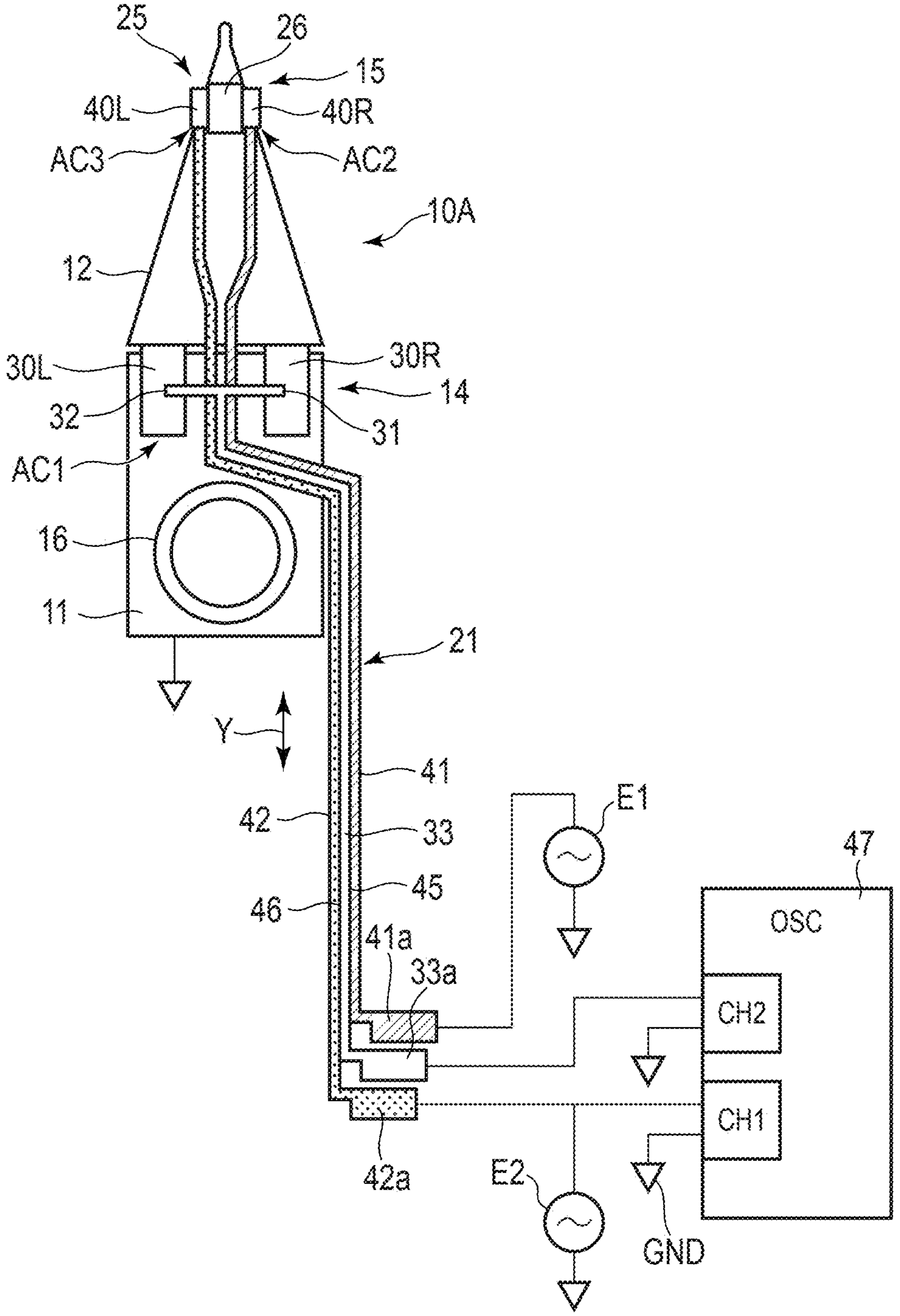
FIG. 4 is a plan view schematically showing the first suspension shown in FIG. 3.

FIG. 3 is a plan view showing an example of the first suspension 10A. FIG. 4 is a plan view schematically showing the first suspension shown 10A. The first suspension 10A includes a base plate 11, a load beam 12, a flexure 13, an actuator mounting portion 14 provided at a first position, and an actuator mounting portion 15 provided at a second position.

As described herein, the first position refers to a position close to the base plate 11 in a longitudinal direction of the suspension 10A. The second position is located near a distal end of the suspension 10A. The base plate 11 and the load beam 12 are formed of, for example, stainless steel plates. A circular boss portion 16 is formed in the base plate 11. The boss portion 16 is fixed to an arm **6*a* of the carriage 6 (shown in FIG. 2**).

Figure 5:
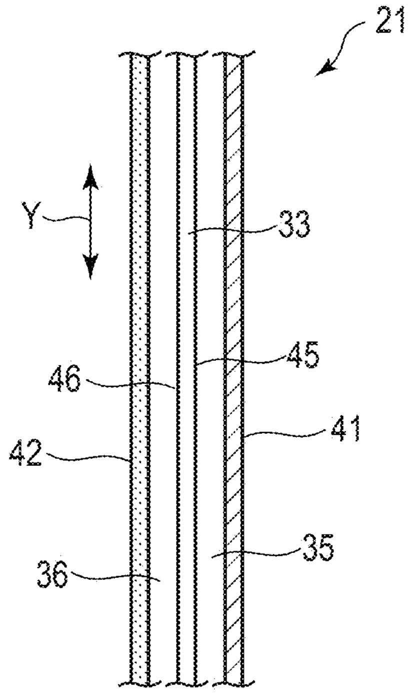
FIG. 5 is a plan view schematically showing a part of a wiring unit of the first suspension.

The flexure 13 includes a metal base 20 and a wiring unit 21. FIG. 5 is a plan view schematically showing a part of the wiring unit 21. In FIG. 4 and FIG. 5, a direction indicated by double-headed arrow Y is the longitudinal direction of the wiring unit 21. The metal base 20 is formed of a stainless steel plate which is thinner than the load beam 12. The wiring unit 21 is provided along the metal base 20.

A swingable gimbal portion 25 is formed near the distal end of the flexure 13. A slider 26 which functions as a magnetic head is mounted on the gimbal portion 25. An element for magnetically recording data on the disk 4, an element for reading data recorded on the disk 4, and the like are provided on the slider 26.

A pair of piezoelectric elements 30R and 30L, which serve as a first actuator AC1, are provided on the actuator mounting portion 14 at the first position. Each of the piezoelectric elements 30R and 30L is composed of lead zirconate titanate (PZT) or the like. The piezoelectric elements 30R and 30L have the same configuration, but are provided in the actuator mounting portion 14 with their (positive and negative) polarities reversed.

In FIG. 3 and FIG. 4, a first conductor 33 of the wiring unit 21 is connected to one of electrodes of the piezoelectric element 30R located on the right side, via a terminal 31. The other electrode of the piezoelectric element 30R is electrically connected to the metal portion (for example, the base plate 11) which constitutes a ground side electric circuit of the first suspension 10A.

In FIG. 3 and FIG. 4, the first conductor 33 is connected to one of electrodes of the piezoelectric element 30L located on the left side, via a terminal 32. The other electrode of the piezoelectric element 30L is electrically connected to the metal portion which constitutes a ground side electric circuit of the first suspension 10A. A first alternating current is supplied to these piezoelectric elements 30R and 30L via a terminal portion 33*a* (shown in FIG. 4) of the first conductor 33.

When the first alternating current is supplied to the piezoelectric element 30R and the piezoelectric element 30L, the piezoelectric element 30R and the piezoelectric element 30L extend and contract in directions opposite to each other. Thus, a distal end of the first suspension 10A can be moved by a small amount in the sway direction (indicated by double-headed arrow A1 in FIG. 3). For example, when the piezoelectric element 30R contracts and the piezoelectric element 30L extends, the distal end of the first suspension 10A moves in the first direction. When the piezoelectric element 30R extends and the piezoelectric element 30L contracts, the distal end of the first suspension 10A moves in the second direction. As described herein, "movement of the distal end of the suspension" means that the position of the element (read/write element) provided at the slider 26 moves in the first direction or the second direction.

A piezoelectric element 40R serving as the second actuator AC2 and a piezoelectric element 40L serving as the third actuator AC3 are provided at the actuator mounting portion 15 at the second position. The piezoelectric elements 40R and 40L are composed of PZT or the like.

In FIG. 3 and FIG. 4, a second conductor 41 of the wiring unit 21 is connected to one of electrodes of the piezoelectric element 40R located on the right side. The other electrode of the piezoelectric element 40R is electrically connected to the ground side electric circuit of the first suspension 10A. The second conductor 41 supplies a second alternating current to the piezoelectric element 40R via the terminal portion 41*a* (shown in FIG. 4). For convenience of descriptions, the second conductor 41 is represented by hatching in FIG. 4 and FIG. 5.

In FIG. 3 and FIG. 4, a third conductor 42 of the wiring unit 21 is connected to one of electrodes of the piezoelectric element 40L located on the left side. The other electrode of the piezoelectric element 40L is electrically connected to the ground side electric circuit of the first suspension 10A. The third conductor 42 supplies a third alternating current to the piezoelectric element 40L via the terminal portion 42*a* (shown in FIG. 4). The phase of the third alternating current is opposite to that of the second alternating current. In other words, there is a phase difference of 180°. For convenience of descriptions, the third conductor 42 is represented by a sand pattern in FIG. 4 and FIG. 5. The longitudinal direction Y of the wiring unit 21 is also the longitudinal directions of the conductors 33, 41, and 42.

When the second alternating current is supplied to the second conductor 41 and the third alternating current is supplied to the third conductor 42, the piezoelectric elements 40R and 40L extend or contract. Thus, a distal end of the first suspension 10A can be moved by a small amount in the sway direction (indicated by double-headed arrow A1 in FIG. 3).

For example, when the piezoelectric element 40R contracts and the piezoelectric element 40L extends, the distal end of the first suspension 10A, i.e., the position of the element (the read/write element) provided on the slider 26, moves in the first direction. When the piezoelectric element 40R extends and the piezoelectric element 40L contracts, the distal end of the first suspension 10A moves in the second direction. The stroke of the piezoelectric elements 40R and 40L is smaller than the stroke of the piezoelectric elements 30R and 30L at the first position.

As shown in FIG. 4 and FIG. 5, the first conductor 33 is provided between the second conductor 41 and the third conductor 42. An insulating portion 35 for electrical insulation is formed between the first conductor 33 and the second conductor 41. An insulating portion 36 for electrical insulation is formed between the first conductor 33 and the third conductor 42.

The first conductor 33 includes a first proximity portion 45 and a second proximity portion 46. The first proximity portion 45 is provided at a position closer to the second conductor 41 than to the third conductor 42 and is provided to be close to the second conductor 41. The first proximity portion 45 extends along the second conductor 41 in the longitudinal direction of the wiring unit 21.

The second proximity portion 46 is provided at a position closer to the third conductor 42 than to the second conductor 41 and is provided to be close to the third conductor 42. The second proximity portion 46 extends along the third conductor 42 in the longitudinal direction of the wiring unit 21. When operating the piezoelectric elements 40R and 40L, alternating currents with mutually opposite phases are supplied to the second conductor 41 and the third conductor 42.

The present inventors focused on the crosstalk generated in the first conductor 33 when drive signals were supplied to the second conductor 41 and the third conductor 42. An oscilloscope 47 (shown in FIG. 4) was used to detect this crosstalk. As shown in FIG. 4, the first connection portion CH1 of the oscilloscope 47 was connected to the third conductor 42, and the second connection portion CH2 was connected to the first conductor 33. GND refers to the ground (signal ground).

A first alternating current was supplied to the second conductor 41 from a signal source E1, and a second alternating current was supplied to the third conductor 42 from a signal source E2. The first alternating current and the second alternating current were sine waves with an amplitude of 8 V and a frequency of 1 kHz, respectively, and had a phase difference of 180°. The crosstalk generated in the first conductor 33 was detected by the oscilloscope 47.

Figure 6:
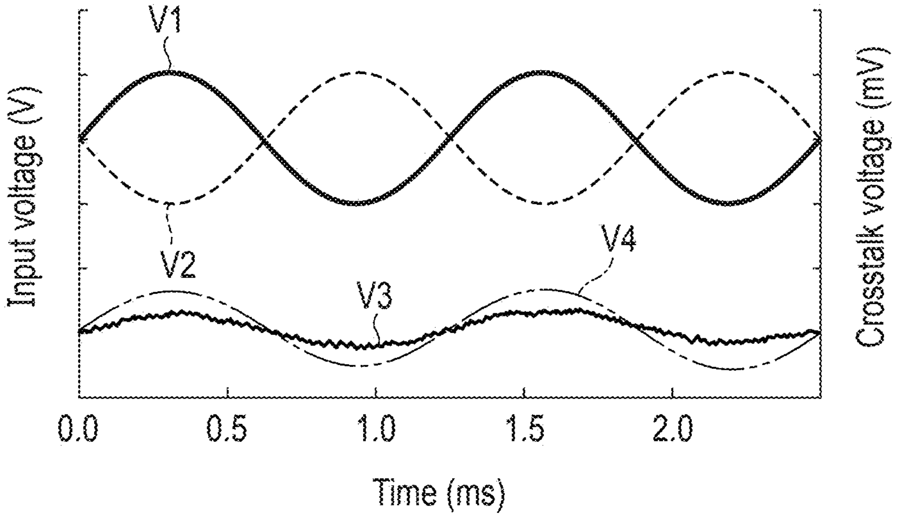
FIG. 6 is a graph showing a relationship between drive signals and crosstalk voltages of the first suspension.

FIG. 6 shows a relationship between the drive signals V1 and V2 supplied to the piezoelectric elements 40R and 40L and a crosstalk voltage V3. As shown in FIG. 6, the first alternating current (drive signal V1) and the second alternating current (drive signal V2) are in opposite phase, and their phases are shifted by 180°. For this reason, since leakage currents of the drive signals V1 and V2 acted on the first conductor 33 so as to cancel each other, crosstalk was suppressed.

As shown in FIG. 6, a minute crosstalk voltage V3 was observed on the first conductor 33, but its level had no problem for practical use. In contrast, in a conventional wiring unit, a relatively large crosstalk voltage V4 was observed on the first conductor due to the influence of a leakage current from a conductor (for example, the second conductor) close to the first conductor.

To effectively suppress crosstalk, the lengths of the first proximity portion 45 and the second proximity portion 46 are desirably equal to each other. In practice, however, if a certain level of crosstalk is acceptable, the lengths of the first proximity portion 45 and the second proximity portion 46 may be different from each other. To suppress crosstalk to a level having no problem in practice, for example, when the length of the first proximity portion 45 is set to 1, the length of the second proximity portion 46 is 0.5 or more and 1.5 or less. More desirably, when the length of the first proximity portion 45 is set to 1, the length of the second proximity portion 46 may be 0.8 or more and 1.2 or less.

Figure 7:
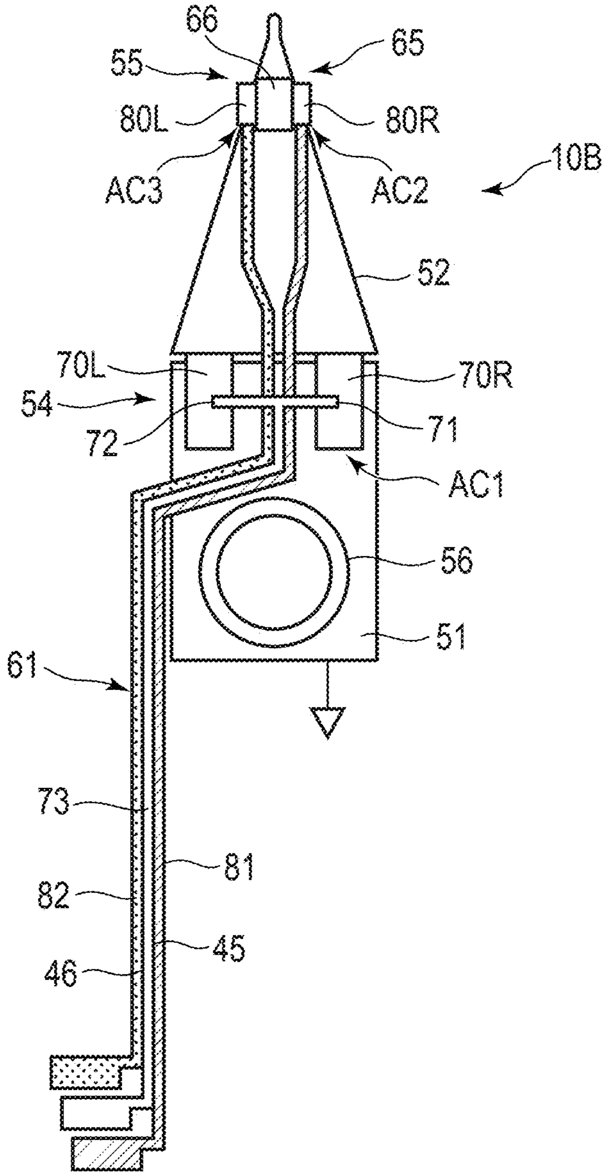
FIG. 7 is a plan view schematically showing a second suspension according to the first embodiment.

FIG. 7 schematically shows the second suspension 10B. The second suspension 10B is configured to have a shape mirroring with respect to the first suspension 10A with the disk 4 (shown in FIG. 2) interposed therebetween. The configurations of the first suspension 10A and the second suspension 10B are substantially equivalent. Therefore, the second suspension 10B will be described briefly.

The second suspension 10B shown in FIG. 7 includes a base plate 51, a load beam 52, an actuator mounting portion 54 provided at a first position, an actuator mounting portion 55 provided at a second position, and a wiring unit 61. A boss portion 56 is fixed to an arm 6*a* of the carriage 6 (shown in FIG. 2). A swingable gimbal section 65 is formed near the distal end of the second suspension 10B. A slider 66 is mounted on the gimbal portion 65.

Piezoelectric elements 70R and 70L serving as the first actuator AC1 are provided in the actuator mounting portion 54 at the first position. In FIG. 7, a first conductor 73 is connected to one of electrodes of the piezoelectric element 70R, which is located on the right side, via the terminal 71 of the wiring unit 61. The other electrode of the piezoelectric element 70R is electrically connected to a metal portion constituting the ground-side circuit of the second suspension 10B.

In FIG. 7, the first conductor 73 is connected to one of electrodes of the piezoelectric element 70L located on the left side, via the terminal 72 of the wiring unit 61. The other electrode of the piezoelectric element 70L is electrically connected to a metal portion constituting the ground-side circuit of the second suspension 10B.

The piezoelectric elements 70R and 70L have a common configuration, but are provided in the actuator mounting section 54 with their polarities reversed relative to each other, similarly to the piezoelectric elements 30R and 30L in the first embodiment (shown in FIG. 3 and FIG. 4). The first conductor 73 is connected to these piezoelectric elements 70R and 70L.

A piezoelectric element 80R serving as the second actuator AC2 and a piezoelectric element 80L serving as the third actuator AC3 are provided at the actuator mounting portion 55 at the second position. In FIG. 7, a second conductor 81 is connected to the piezoelectric element 80R located on the right side. In FIG. 7, a third conductor 82 is connected to the piezoelectric element 80L located on the left side.

The first conductor 73 is provided between the second conductor 81 and the third conductor 82. The first conductor 73 includes a first proximity portion 45 and a second proximity portion 46, similarly to the first conductor 33 of the first embodiment (shown in FIG. 4 and FIG. 5). The first proximity portion 45 extends along the second conductor 81 in the longitudinal direction of the wiring unit 61. The second proximity portion 46 extends along the third conductor 82 in the longitudinal direction of the wiring unit 21.

When operating the piezoelectric elements 80R and 80L, alternating currents with mutually opposite phases are supplied to the second conductor 81 and the third conductor 82 as drive signals. By making the alternating currents with opposite phases act on the first conductor 73, crosstalk generated in the first conductor 73 can be suppressed.

Figure 8:
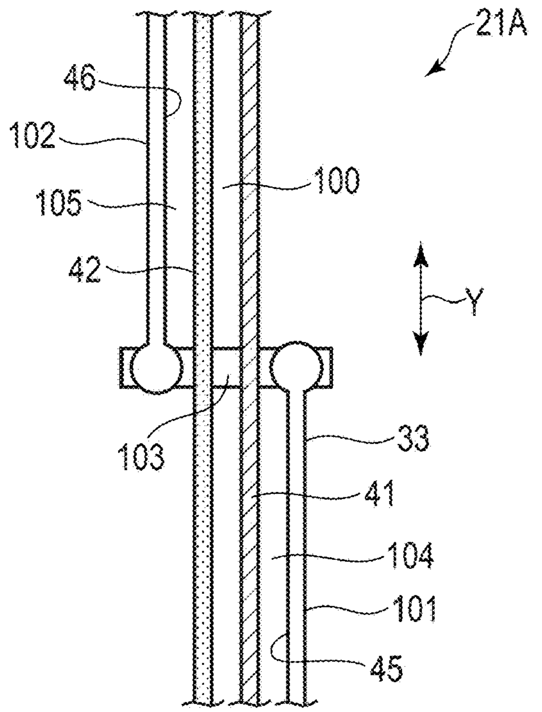
FIG. 8 is a plan view schematically representing a part of a wiring unit according to a second embodiment.

Second Embodiment (FIG. 8)

FIG. 8 is a plan view schematically showing a wiring unit 21A according to the second embodiment. Constituent elements other than the wiring unit 21A may be the same as those of the suspension described in the first embodiment. The wiring unit 21A in this embodiment also includes a first proximity portion 45 and a second proximity portion 46. The first proximity portion 45 of the wiring unit 21A is provided at a position closer to the second conductor 41 than to the third conductor 42. The first proximity portion 45 extends along the second conductor 41 in the longitudinal direction of the wiring unit 21A (indicated by a double-headed arrow Y). The second proximity portion 46 is provided at a position closer to the third conductor 42 than to the second conductor 41 and extends along the third conductor 42 in the longitudinal direction of the wiring unit 21A.

As shown in FIG. 8, the second conductor 41 and the third conductor 42 are provided to be adjacent to each other. An insulating portion 100 for electrical insulation is formed between the second conductor 41 and the third conductor 42. The first conductor 33 has a first energized section 101 and a second energized section 102 in the longitudinal direction of the wiring unit 21A (indicated by a double-headed arrow Y). The first energized section 101 is set outside the second conductor 41 and extends along the second conductor 41 in the longitudinal direction of the wiring unit 21A. The first energized section 101 includes a first proximity portion 45.

The second energized section 102 is set outside the third conductor 42 and extends along the third conductor 42 in the longitudinal direction of the wiring unit 21A. The second energized section 102 includes a second proximity portion 46. The first energized section 101 and the second energized section 102 is connected to each other by a jumper conductor 103. An insulating portion 104 is formed between the second conductor 41 and the first energized section 101. An insulating portion 105 is formed between the third conductor 42 and the second energized section 102.

Figure 9:
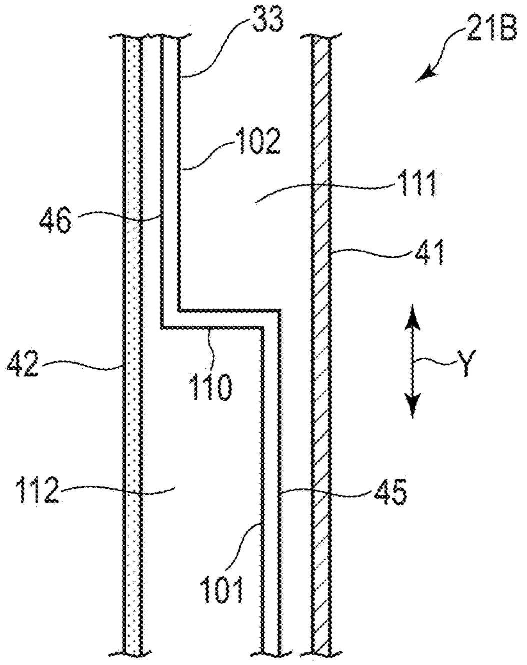
FIG. 9 is a plan view schematically representing a part of a wiring unit according to a third embodiment.

Third Embodiment (FIG. 9)

FIG. 9 is a plan view schematically showing a wiring unit 21B according to the third embodiment. Constituent elements other than the wiring unit 21B may be the same as those of the suspension described in the first embodiment. The wiring unit 21B in this embodiment also includes a first proximity portion 45 and a second proximity portion 46. The first proximity portion 45 is provided at a position closer to the second conductor 41 than to the third conductor 42. The first proximity portion 45 extends along the second conductor 41 in the longitudinal direction of the wiring unit 21B (indicated by a double-headed arrow Y). The second proximity portion 46 is provided at a position closer to the third conductor 42 than to the second conductor 41. The second proximity portion 46 extends along the third conductor 42 in the longitudinal direction of the wiring unit 21B.

As shown in FIG. 9, the first conductor 33 is positioned between the second conductor 41 and the third conductor 42. The first conductor 33 includes a first energized section 101, a second energized section 102, and a connection portion 110. The first energized section 101 extends along the second conductor 41 in the longitudinal direction of the wiring unit 21B. The first energized section 101 includes a first proximity portion 45. The second energized section 102 extends along the third conductor 42 in the longitudinal direction of the wiring unit 21B. The second energized section 102 includes a second proximity portion 46. An insulating portion 111 is formed between the first conductor 33 and the second conductor 41. An insulating portion 112 is formed between the first conductor 33 and the third conductor 42.

Figure 10:
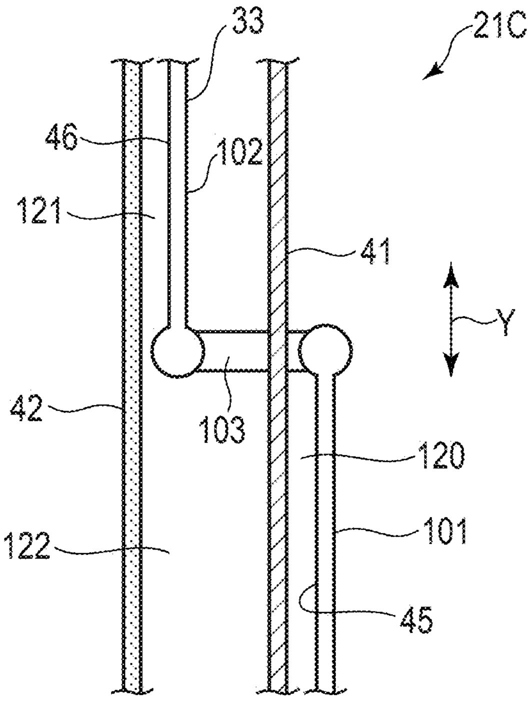
FIG. 10 is a plan view schematically representing a part of a wiring unit according to a fourth embodiment.

Fourth Embodiment (FIG. 10)

FIG. 10 is a plan view schematically showing a wiring unit 21C according to the fourth embodiment. Constituent elements other than the wiring unit 21C may be the same as those of the suspension described in the first embodiment. The wiring unit 21C in this embodiment also includes a first proximity portion 45 and a second proximity portion 46. The first proximity portion 45 is provided at a position closer to the second conductor 41 than to the third conductor 42. The first proximity portion 45 extends along the second conductor 41 in the longitudinal direction of the wiring unit 21C (indicated by a double-headed arrow Y). The second proximity portion 46 is provided at a position closer to the third conductor 42 than to the second conductor 41. The second proximity portion 46 extends along the third conductor 42 in the longitudinal direction of the wiring unit 21C.

As shown in FIG. 10, the first conductor 33 includes a first energized section 101, a second energized section 102, and a jumper conductor 103. The first energized section 101 is set outside the second conductor 41 and extends along the second conductor 41 in the longitudinal direction of the wiring unit 21C. The first energized section 101 includes a first proximity portion 45. The second energized section 102 is set between the second conductor 41 and the third conductor 42. The second energized section 102 extends along the third conductor 42 in the longitudinal direction of the wiring unit 21C. The second energized section 102 includes a second proximity portion 46.

The first energized section 101 and the second energized section 102 is connected to each other by a jumper conductor 103. An insulating portion 120 is formed between the second conductor 41 and the first energized section 101. An insulating portion 121 is formed between the third conductor 42 and the second energized section 102. An insulating portion 122 is formed between the second conductor 41 and the third conductor 42.

It goes without saying that upon carrying out the present invention, the specific aspect of each of the elements constituting the suspension can be variously modified. The wiring unit can also be implemented in various configurations as necessary. An example of the actuator mounted on the suspension is a piezoelectric element, but may be any component driven by an electrical signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive suspension comprising:

a first actuator provided at a first position;

a second actuator and a third actuator provided at a second position; and a wiring unit, the wiring unit including:

a first conductor electrically connected to the first actuator and supplying a first alternating current to the first actuator;

a second conductor electrically connected to the second actuator and supplying a second alternating current to the second actuator; and a third conductor electrically connected to the third actuator and supplying a third alternating current having a phase opposite to a phase of the second alternating current to the third actuator, the first conductor comprising:

a first proximity portion provided at a position closer to the second conductor than to the third conductor and extending along the second conductor in a longitudinal direction of the wiring unit; and a second proximity portion provided at a position closer to the third conductor than to the second conductor and extending along the third conductor in a longitudinal direction of the wiring unit.

2. The disk drive suspension of claim 1, wherein the first conductor is provided between the second conductor and the third conductor, and the first conductor includes:

a first proximity portion extending along the second conductor in the longitudinal direction of the wiring unit; and a second proximity portion extending along the third conductor in the longitudinal direction of the wiring unit.

3. The disk drive suspension of claim 1, wherein the second conductor and the third conductor are provided to be adjacent to each other, and the first conductor has:

a first energized section provided outside the second conductor, extending along the second conductor in the longitudinal direction of the wiring unit, and including the first proximity portion; and a second energized section provided outside the third conductor, extending along the third conductor in the longitudinal direction of the wiring unit, and including the second proximity portion.

4. The disk drive suspension of claim 1, wherein the first conductor is provided between the second conductor and the third conductor, and the first conductor has:

a first energized section extending along the second conductor in the longitudinal direction of the wiring unit, and including the first proximity portion; and a second energized section extending along the third conductor in the longitudinal direction of the wiring unit, and including the second proximity portion.

5. The disk drive suspension of claim 1, wherein the first conductor has:

a first energized section provided outside the second conductor, extending along the second conductor in the longitudinal direction of the wiring unit, and including the first proximity portion; and a second energized section provided between the second conductor and the third conductor, extending along the third conductor in the longitudinal direction of the wiring unit, and including the second proximity portion.

* * * * *